(No Model.)

F. E. DE JEAN.
BEER PITCHER.

No. 366,207.

Patented July 12, 1887.

Witnesses.
Geo. H. E. Trouvelot
Fred. J. F. Schwartz

Inventor.
Fred. E. De Jean,
by his attorney,
Geo Willis Pierce

N. PETERS, Photo-Lithographer, Washington, D. C.

UNITED STATES PATENT OFFICE.

FRED. E. DE JEAN, OF NEWBURYPORT, MASSACHUSETTS.

BEER-PITCHER.

SPECIFICATION forming part of Letters Patent No. 366,207, dated July 12, 1887.

Application filed November 18, 1886. Serial No. 219,251. (No model.)

*To all whom it may concern:*

Be it known that I, FRED. E. DE JEAN, of Newburyport, in the county of Essex and State of Massachusetts, have invented certain Improvements in Beer-Pitchers, of which the following is a specification.

This invention relates to pitchers into which frothy drinking-liquids — such as ale, beer, &c. — are drawn, and from which they are poured for consumption.

It is well known that in drawing beer, &c., from a barrel much froth is formed on its surface, which causes delay in pouring the same into tumblers and tankards, and time has to be allowed for the beer to settle, and in no case is the beer perfectly clear and liquid.

My invention has for its object to obviate these annoyances, and to cause the beer or other liquid to be strained and settled immediately, and to be drawn from the bottom of the pitcher in any desired quantity, free from froth or any annoyance.

Figure 1:
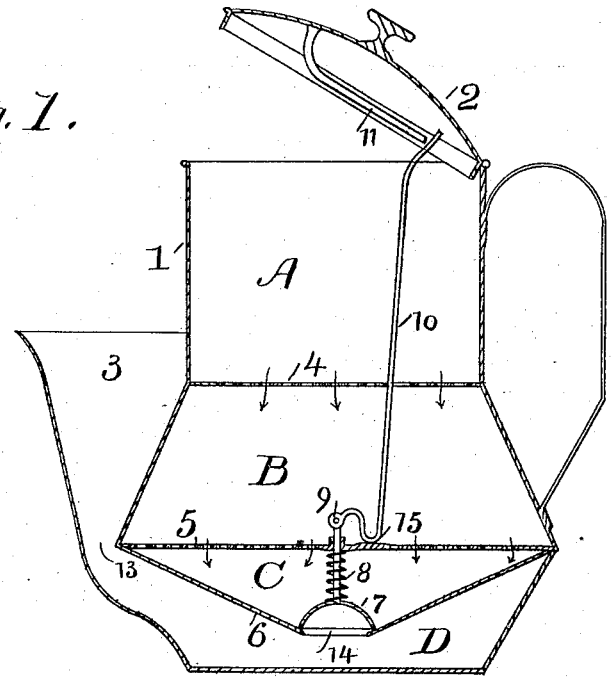

In the drawings, Figure 1 shows a sectional view of a beer-pitcher embodying my invention. 1 represents the body of the pitcher, divided internally into the separate chambers A, B, C, and D by the strainers 4 and 5, and by the centrally-perforated and dishing floor 6. The lower chamber, D, is connected to the spout or mouth of the pitcher 3 by the opening 13.

To the under side of the cover 2 is attached at one end a lever or striker, 11, arranged to strike and force backward the upper end of the horizontal lever or rod 10, which extends downward into the chamber B, its lower end being bent, as shown, into the form of an inverted letter S, its extremity being pivoted to the end of the horizontal lever 9, which extends downward through the strainer 5 into the chamber C, where it terminates in a valve, 7, integral therewith, which serves to close the orifice 14 in the center of the inclined floor 6. The valve 7 is kept closed by the spring 8, which bears against the under side of the strainer 5 and the top of the valve 7.

I do not confine myself to any particular shape or form of valve, as I may employ any valve to suit any form of pitcher.

The lower end of the rod 10 is so shaped as to form a fulcrum, 15, which rests on the upper side of the strainer 5.

I make the strainer 4 coarser than the strainer 5, so that the work of straining liquids is divided between the two, and the coarser extraneous matter is kept at the top of the pitcher, where it can be readily removed.

When the pitcher is to be filled, the cover 2 is thrown back, as shown in full lines, the beer or other liquid is run into the top of the pitcher, into the receiving-chamber A, falling onto the strainer 4, and passing through it into the chamber B falls upon the second strainer, 5, and passing through that enters the chamber C. The pitcher is filled full to the top, if desired, and is allowed to stand still but a second to clarify in the chambers B and C.

To pour the beer out from the pitcher the cover is closed, causing the lug or lever 11 to strike and force backward the rod 10, which, rocking on its fulcrum 15, raises the rod 9 and valve 7 against the pressure of the spring 8, allowing the beer to run through the hole 14 into the chamber D, from whence it is poured through the mouth or spout 3, with which it is continuous. The valve 7 closes automatically when the cover is thrown back. The froth rising on the top of the beer remains there, and can be readily removed, while the liquid is perfectly strained, and drawn from the bottom of the pitcher perfectly clear. The strainers appear to assist in the process of separation of the froth and liquid. As the liquid falls to the lower part of the pitcher it is immediately strained, and by the time the pitcher is full the liquid at the bottom is clarified and ready to be poured.

Figure 2:
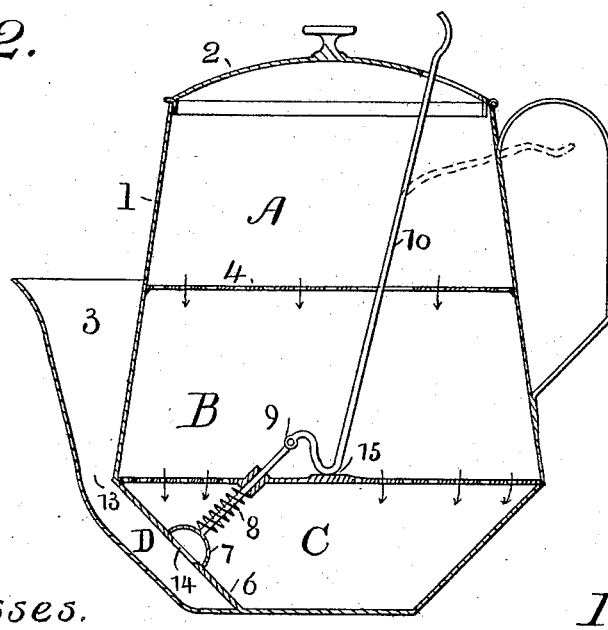

I may locate the valve 7 otherwise than centrally of the pitcher, if desired, as I show in Fig. 2, and I may operate the rod 10 manually, as shown in the same figure, instead of automatically, as shown and described in Fig. 1.

In Fig. 2 the valve 7 is placed at one side of the pitcher, and the rod 10 extends at an angle up and across the interior of the same, through the cover 2, (or it may extend through the side of the pitcher,) as shown in dotted lines, so that the cover 2 can be closed or opened and the valve 7 opened manually at will.

Although I have shown and described two strainers, but one will be required in many cases, two being used for some kinds of liquids.

I claim as my invention—

A beer-pitcher formed with a receiving-chamber, A, clarifying-chambers B C, separated from each other by strainers 4 and 5, the self-closing valve 7, the rod 10, with a fulcrum, 15, as described, and connected at its lower end to said valve, its other end terminating at the top of chamber A, and the cover 2, provided with a striker, 11, substantially as and for the purpose described.

In testimony whereof I have signed my name to this specification, in the presence of two subscribing witnesses, this 16th day of November, 1886.

FRED. E. DE JEAN.

Witnesses:
GEO. WILLIS PIERCE,
FRED J. F. SCHWARTZ.